BEST AVAILABLE COPY

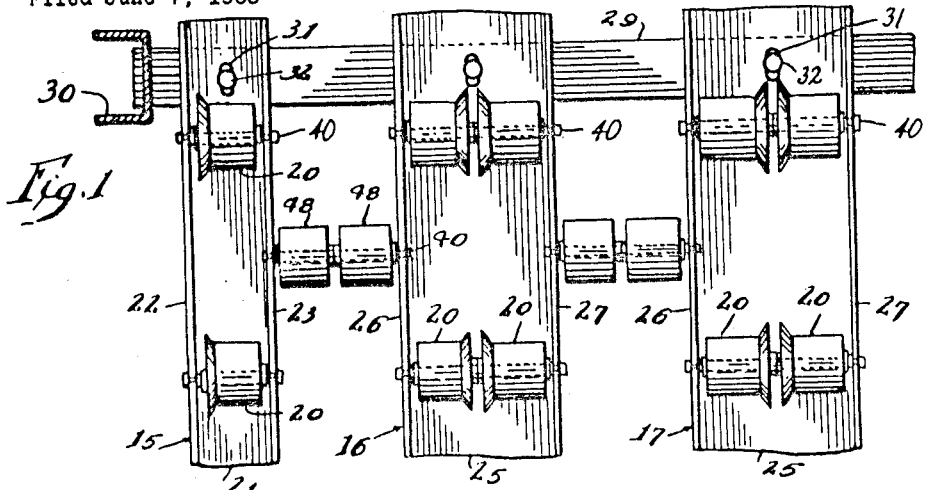

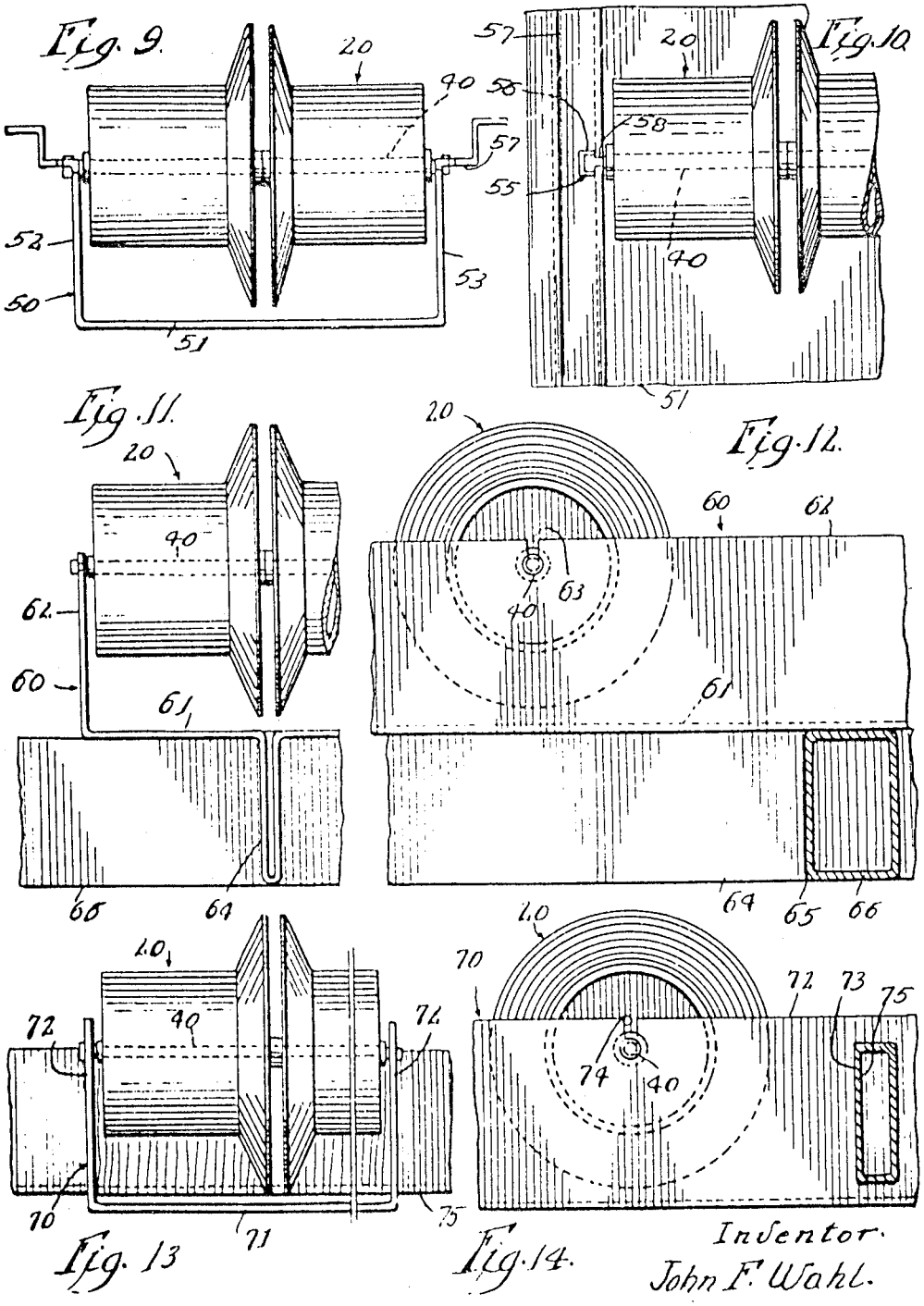

United States Patent Office 3,209,879
Patented Oct. 5, 1965

3,209,879
STORAGE RACK AND CONVEYER
John F. Wahl, Sterling, Ill., assignor to Mallard Plastics Inc., Sterling, Ill., a corporation of Illinois
Filed June 7, 1963, Ser. No. 286,238
7 Claims. (Cl. 193—35)

This invention relates to a storage rack and conveyer, and more particularly to improved and simplified construction for such a rack and conveyer.

The storage rack and conveyer of the invention may be disposed in inclined manner for gravity action, or horizontally for conveyer movement in response to manual or other force.

One object of the invention is to provide a storage rack and conveyer wherein unused space is reduced to a minimum, thereby utilizing virtually all available space for the storage function.

Another object is to provide a storage rack and conveyer wherein the main structural elements are more or less simple channels. Rollers are carried between the channel sides on axles, the ends of which are mounted on and interlock with the channel sides. The axles thus cooperate to increase the beam strength and torsional rigidity of the channels, thereby enabling the channels to be made economically from comparatively light metal.

Still another object is to provide a storage rack and conveyer wherein the axles for the rollers are supported at both ends. This permits use of axles having comparatively small diameter, a feature resulting in reduced friction with associated rollers. In addition, when each axle carries two rollers, the mounting of the axle at both ends cooperates to provide high resistance to twisting when only one of the rollers is loaded.

Still another object is to provide a storage rack and conveyer having parts that may be shipped in unassembled condition and readily and quickly assembled without special tools. The axles and rollers may be installed after the channels are mounted in place, and the positions and numbers of rollers easily may be changed for increased or decreased loading per roller, or to accommodate cartons or articles of various sizes.

Other objects, advantages and details of the invention will be apparent as the description proceeds, reference being had to the accompanying drawings wherein various forms of the invention are shown. It is to be understood that the description and drawings are illustrative only, and that the scope of the invention is to be measured by the appended claims.

In the drawings:

FIG. 1 is a fragmentary top plan view of a storage rack and conveyer embodying the invention.

FIG. 2 is a fragmentary elevational view of the rack and conveyer shown in FIG. 1.

FIG. 3 is an enlarged front elevational view of a roller assembly used in the invention.

FIG. 4 is a fragmentary side elevational view of the assembly shown in FIG. 3, the illustrated channel being mounted at a slight angle with the horizontal to provide a gravity conveyer.

FIG. 5 is an enlarged fragmentary view of an end of an axle used in the invention.

FIG. 6 is an enlarged fragmentary elevational view showing a notch or opening in a channel side adapted to receive an associated axle.

FIG. 7 is an enlarged fragmentary view of an end of another form of axle used in the invention.

FIG. 8 is an enlarged fragmentary elevational view of a channel side showing a modified opening adapted to receive the axle of FIG. 7.

FIG. 9 is a front elevational view of a roller assembly having a modified channel.

FIG. 10 is a fragmentary top plan view of the roller assembly shown in FIG. 9.

FIG. 11 is a fragmentary front elevational view of a roller assembly having another modified channel and showing the relationship between the channel and a transverse supporting member.

FIG. 12 is a fragmentary side elevational view of the roller assembly shown in FIG. 11.

FIG. 13 is a fragmentary front elevational view of a roller assembly having a further modified channel and showing the relationship between the channel and a transverse supporting member.

FIG. 14 is a fragmentary side elevational view of the roller assembly shown in FIG. 13.

Referring to the drawings, and particularly to FIGS. 1 and 2, a multiple storage rack and conveyer embodying the invention includes a plurality of spaced, parallel, upwardly facing channels 15, 16 and 17. Channel 15 is an outermost channel in the illustrated rack and therefore carries a single row of rollers 20. Channels 16 and 17 are intermediate channels that carry double rows of rollers 20 and thus have about twice the width of channel 15.

Channel 15 has a channel bottom 21 and sides 22 and 23, while channels 16 and 17 have channel bottoms 25 and sides 26 and 27.

Channels 15, 16 and 17 rest on and are supported by a plurality of transverse members 29, one of which is shown in FIGS. 1 and 2, and such transverse members are suitably supported at their ends by upright members 30. Channel bottoms 21 and 25 have longitudinally spaced mounting slots 31 through which extend bolts 32 or the like for securing the channels to transverse members 29.

The upper edge portions of the sides of each channel have a plurality of spaced notches or openings adapted to receive axles that carry rollers 20. FIG. 4 shows a straight-sided notch 34 in the upper edge portion of a channel 16, while FIG. 6 shows a notch 35 that has a reduced entrance 36. FIG. 8 shows an opening 38 in the upper portion of a channel side, the opening being spaced somewhat below the upper edge of the channel side. The FIG. 8 form, of course, affords increased channel strength due to the presence of structural material above opening 38. Thus, a channel provided with openings 38 may use lighter material and have substantially the same strength as a channel provided with notches such as 34 and 35.

Axles 40 extend transversely of channels 15, 16 and 17, the end regions of the axles having grooves 42 (FIG. 5) that interfit within notches such as 34 and 35. The material of the channel sides surrounding the notches enters axle grooves 42 and serves to interlock axles 40 with the channel sides, thereby tending to prevent the channel sides from spreading or collapsing when the channel is under load. This relationship between the axles and channels is effective to increase the beam strength and torsional rigidity of the channels, thus permitting use of lighter and more economical material in the channels than otherwise would be possible.

In the case of channels having notches 35 with reduced entrances 36, the axles engage the channels in snap-in manner, whereas this feature is not present with notches 34 or openings 38. In all instances, however, it is contemplated that axles 40 readily may be inserted and removed, thereby facilitating original assembly and enabling the axle spacing to be changed to accommodate cartons or articles of different size and weight characteristics.

FIG. 7 shows one end of a modified axle 43 wherein each end has a groove 44 extending through about half the cross section. Axle 43 is designed to interfit with an opening 38 (FIG. 8), and can be cut and grooved in a single forming operation.

A roller 20 (FIG. 3) carried on axle 40 may be of the type shown in copending U.S. application Serial No. 197,630, filed May 25, 1962, now Patent No. 3,117,662. Such a roller has a cylindrical load-carrying portion 45 and an integral tracking means 46 at one end. Alternatively, as shown at the right in FIG. 3, a cylindrical roller 48 may be used, and if a tracking means for that roller is desired, it may take the form of a separate rotatable tracking means 49. As further alternatives, a pair of cylindrical rollers 48 may be used in combination with an adjoining pair of separate tracking means 49, or the two tracking means 49 may be combined in a single double tracking means (not shown).

Referring back to FIGS. 1 and 2, in some instances it will be desirable to provide axles 40 and rollers 48 between adjacent channels. Such axles and rollers, of course, will have staggered relation with the axles and rollers mounted between the sides of the respective channels, as shown in FIG. 1. Axles extending between adjacent channels cooperate further to increase the strength of the over-all assembly. These axles may be of any desired length and carry any desired number of rollers.

FIGS. 9 and 10 show a roller assembly of channel, axle and rollers wherein the channel has modified form. Illustrated channel 50 has bottom 51 and sides 52 and 53. The upper portions of the sides 52 and 53 have Z-shape in cross section, as best shown in FIG. 9. A plurality of spaced openings 55 (FIG. 10) are provided in the upper portions of the sides 52 and 53, each opening having a part 56 in the lower horizontal leg 57 of the Z-shape and a reduced part 58 in the side portion immediately below. Opening 55 with its two parts 56 and 58 readily accommodates an axle 40 having a groove 42 in its end region.

By way of comparison, a channel 50 constructed as shown in FIG. 9 may be made of 16-gauge material and afford substantially the same strength as a channel 16 (FIGS. 1 and 2) made with 14-gauge material, the latter having notches 34 or 35.

FIGS. 11 and 12 illustrate a roller assembly wherein a modified channel 60 is used. Channel 60 has a bottom 61 and parallel sides 62 provided with spaced notches or openings 63. Channel 60 also has a web portion 64 extending downwardly from bottom 61, web portion 64 having spaced openings 65 (FIG. 12) through which extend supporting transverse members 66. Web portions 64, of course, give additional strength to the channel and resultant assembly.

FIGS. 13 and 14 illustrate a roller assembly having still another modified channel. As shown, channel 70 has a bottom 71 and spaced parallel sides 72. The channel sides 72 have spaced lower openings 73 (FIG. 14) in staggered relation with axle-receiving openings or notches 74. Transverse members 75 extend through openings 73 and provide support for channel 70. This arrangement, of course, accommodates the transverse supporting members 75 in the same vertical space as is occupied by channels 70, thus maximizing the space available for storage.

The storage rack and conveyer of the invention has a low friction rotating tracking means that separates adjacent rows of stored materials. The axles for the rollers and tracking means are supported at their ends and the width of the tracking means is kept to a minimum so virtually all lateral space is utilized for storage.

A rack and conveyer installation may and usually does have a number of vertically spaced units. The construction of the invention is such that the rack and conveyer units occupy minimum space vertically, thereby maximizing the space available for storage in vertical direction.

It will be understood that the structure of the invention may be used as a conveyer per se wherein the storage function is incidental or non-existent.

From the above description it is thought that the concentration and advantages of the invention will be readily apparent to those skilled in the art. Various changes in detail may be made without departing from the spirit or losing the advantages of the invention.

Having thus described the invention, what I claim as new and desire to secure by Letters Patent is:

1. In a storage rack and conveyor, the combination comprising:
   an elongated upwardly facing channel having a bottom and parallel sides;
   the sides of said channel having a plurality of spaced opposed openings in the upper edge portions;
   axles mounted on said channel, the end regions of each axle received within opposed openings in said channel sides;
   a pair of closely spaced rollers mounted for rotation on each axle between said channel sides, each roller having a load carrying portion; and
   raised rotatable tracking means adjacent the load carrying portions of said rollers, said tracking means of each pair of rollers closely adjacent each other, whereby said combination constitutes the lateral part of each of two side-by-side conveyors that are separated by the small space between adjacent tracking means.

2. The combination of claim 1 wherein said axles are of substantially uniform diameter and have grooves in each end region, said axles detachably mounted in drop-in manner on said channel with the grooved portions received within opposed openings and interlocking with said channel sides, said axles preventing spread and collapse of said sides and thus effective to increase the beam strength and torsional rigidity of said channel.

3. The combination of claim 1 with the addition of another similar combination in spaced relation therewith, the channels of the combinations parallel to each other, and means supporting and securing the channels in position.

4. The combination of claim 1 with the addition of an upwardly facing outermost channel in spaced parallel relation with said claim 1 channel, said outermost channel having a bottom and parallel sides, the upper edge portions of said sides having a plurality of spaced opposed openings, axles mounted on said outermost channel, the end regions of each axle received within opposed openings in said sides, a single roller mounted for rotation on each axle, each roller having a load carrying portion, raised rotatable tracking means adjacent said load carrying portions of said rollers on the side thereof remote from the claim 1 combination, and means supporting and securing said channels in position.

5. The combination of claim 1 wherein the upper portions of said channel sides have Z-shape in cross section, each of said openings having a part in the lower horizontal leg of the Z-shape and a reduced part in the channel side below said horizontal leg, said axles having grooves in each end region with the grooved portions received within the reduced parts of said openings and interlocking with the channel sides.

6. The combination of claim 1 wherein said channel has a web portion extending downwardly from said bottom, said web portion having spaced openings therethrough, and spaced transverse members extending through the openings in said web portion for supporting said channel.

7. The combination of claim 1 wherein said channel sides have a plurality of spaced opposed openings in the lower portions thereof, and spaced transverse members extending through said last openings for supporting said channel, thereby minimizing the vertical dimension of the storage rack and conveyor embodying the combination.

References Cited by the Examiner

UNITED STATES PATENTS

| | | | |
|---|---|---|---|
| 1,038,514 | 9/12 | Anderson | 193—35 |
| 1,943,998 | 1/34 | Adams | 193—37 |
| 1,962,372 | 6/34 | Twomley | 193—35 |
| 2,891,677 | 6/59 | Ritchie | 193—35 |
| 2,979,178 | 4/61 | Hamre | 193—35 |
| 2,983,352 | 5/61 | De Flora | 193—35 |
| 3,095,956 | 7/56 | McGill | 193—35 |

SAMUEL F. COLEMAN, *Primary Examiner.*

ANDRES H. NIELSEN, *Examiner.*